United States Patent
Evans et al.

(10) Patent No.: US 9,865,895 B2
(45) Date of Patent: Jan. 9, 2018

(54) METHODS TO PREPARE STABLE ELECTROLYTES FOR IRON REDOX FLOW BATTERIES

(71) Applicant: ESS TECH, INC., Portland, OR (US)

(72) Inventors: Craig E. Evans, West Linn, OR (US); Yang Song, West Linn, OR (US)

(73) Assignee: ESS Tech, Inc., Portland, OR (US)

( * ) Notice: Subject to any disclaimer, the term of this patent is extended or adjusted under 35 U.S.C. 154(b) by 720 days.

(21) Appl. No.: 14/201,244

(22) Filed: Mar. 7, 2014

(65) Prior Publication Data

US 2014/0272493 A1    Sep. 18, 2014

Related U.S. Application Data

(60) Provisional application No. 61/778,143, filed on Mar. 12, 2013.

(51) Int. Cl.
*H01M 8/18* (2006.01)
*H01M 8/20* (2006.01)

(52) U.S. Cl.
CPC .......... *H01M 8/188* (2013.01); *H01M 8/20* (2013.01); *H01M 2300/0002* (2013.01); *H01M 2300/0005* (2013.01); *Y02E 60/528* (2013.01)

(58) Field of Classification Search
CPC ...................................................... H01M 8/18
See application file for complete search history.

(56) References Cited

U.S. PATENT DOCUMENTS

| | | | | |
|---|---|---|---|---|
| 4,785,814 A | * | 11/1988 | Kane | A61B 5/1459 356/41 |
| 5,439,757 A | * | 8/1995 | Zito | H01M 8/04186 429/50 |
| 5,804,329 A | * | 9/1998 | Amendola | B60L 11/1879 429/101 |
| 2002/0194905 A1 | * | 12/2002 | Moghissi | B60C 23/006 73/146 |
| 2008/0193828 A1 | * | 8/2008 | Sahu | B60L 11/1822 429/63 |
| 2013/0029185 A1 | * | 1/2013 | Ridley | H01M 10/48 429/51 |

FOREIGN PATENT DOCUMENTS

WO    2012167057 A2    12/2012

OTHER PUBLICATIONS

Fujiwara, Y. et al., "Electrodeposition of Fe—C Alloys from Baths Containing Dicarboxylic Acids with a Linear Alkyl Chain," Journal of the Electrochemical Society, vol. 143, No. 8, pp. 2584-2590, Aug. 1996, 8 pages.

(Continued)

*Primary Examiner* — Alex Usyatinsky
(74) *Attorney, Agent, or Firm* — McCoy Russell LLP

(57) ABSTRACT

An iron redox flow battery system, comprising a redox electrode, a plating electrolyte tank, a plating electrode, a redox electrolyte tank with additional acid additives that may be introduced into the electrolytes in response to electrolyte pH. The acid additives may act to suppress undesired chemical reactions that create losses within the battery and may be added in response to sensor indications of these reactions.

9 Claims, 10 Drawing Sheets

(56) References Cited

OTHER PUBLICATIONS

Fujiwara, Y. et al., "Effects of Hydroxycarboxylic Acids on the Electrodeposition of Fe—C Alloys," Denki Kagaku, vol. 61, No. 7, pp. 840-842, Jul. 1993, 3 pages.
Yin, K. et al., "Effects of Boric Acid on the Electrodeposition of Iron, Nickel and Iron-Nickel," Surface and Coatings Technology, vol. 78, No. 1-3, pp. 205-210, Jan. 1996, 6 pages.
Hruska, L.W. et al., "Investigation of Factors Affecting Performance of the Iron-Redox Battery," Journal of The Electrochemical Society, vol. 128, No. 1, pp. 18-25, Jan. 1981, 8 pages.
Nagayama, M. et al., "The Anodic Oxidation of Iron in a Neutral Solution: 1. The Nature and Composition of the Passive Film," Journal of the Electrochemical Society, vol. 109, No. 9, pp. 781-790, Sep. 1962, 11 pages.
Nagayama, M. et al., "The Anodic Oxidation of Iron in a Neutral Solution: 2. Effect of Ferrous Ion and pH on the Behavior of Passive Iron," Journal of The Electrochemical Society, vol. 110, No. 6, pp. 670-680, Jun. 1963, 12 pages.
Mellentine, J., "Performance Characterization and Cost Assessment of an Iron Hybrid Flow Battery," Master's Thesis, University of Iceland, Jan. 2011, 136 pages.
Izaki, M. et al., "Hardness and Carbon Content of Fe Electroplate from Sulfate Bath Containing I-Ascorbic Acid and Citric Acid," Journal of the Surface Finishing Society of Japan, vol. 40, No. 11, pp. 1304-1305, Nov. 1989, 3 pages.

\* cited by examiner

METHODS TO PREPARE STABLE ELECTROLYTES FOR IRON REDOX FLOW BATTERIES

CROSS-REFERENCE TO RELATED APPLICATION

This application claims the benefit under 35 U.S.C. 119(e) of U.S. Provisional Patent Application No. 61/778,143, filed Mar. 12, 2013 and entitled METHODS TO PREPARE STABLE ELECTROLYTES FOR ALL IRON REDOX FLOW BATTERIES, the entirety of which is incorporated herein by reference for all purposes.

ACKNOWLEDGMENT OF GOVERNMENT SUPPORT

This invention was made with government support under contract no. DE-AR0000261 awarded by the DOE, Office of ARPA-E. The government has certain rights in the invention.

BACKGROUND AND SUMMARY

The reduction-oxidation (redox) flow battery is an electrochemical storage device that stores energy in a chemical form and converts the stored chemical energy to an electrical form via spontaneous reverse redox reactions. The reaction in a flow battery is reversible, so conversely, the dispensed chemical energy can be restored by the application of an electrical current inducing the reversed redox reactions. A single redox flow battery cell generally includes a negative electrode, a membrane barrier, a positive electrode, and electrolytes containing electro-active materials. Multiple cells may be combined in series or parallel to create a higher voltage or current in a flow battery. Electrolytes are typically stored in external tanks and are pumped through both sides of the battery. When a charge current is applied, electrolytes lose electron(s) at the positive electrode and gain electron(s) at the negative electrode. The membrane barrier prevents the positive electrolyte and negative electrolyte from mixing while allowing ionic conductance. When a discharge current is applied, reverse redox reactions occur on the electrodes. The electrical potential difference across the battery is maintained by chemical redox reactions within the electrolytes and can induce a current through a conductor while the reactions are sustained. The amount of energy stored by a redox battery is limited by the amount of electro-active material available in electrolytes for discharge, depending on the total volume of electrolytes and the solubility of the electro-active materials.

Hybrid flow batteries are distinguished by the deposit of one or more of the electro-active materials as a solid layer on an electrode. Hybrid batteries may, for instance, include a chemical that plates as a solid on a substrate throughout the charge reaction and its discharged species may be dissolved by the electrolyte throughout discharge. In hybrid battery systems, the energy stored by the redox battery may be limited by the amount of metal plated during charge and may accordingly be determined by the efficiency of the plating system as well as the available volume and surface area to plate.

In a hybrid flow battery system the negative electrode may be referred to as the plating electrode and the positive electrode may be referred to as the redox electrode. The electrolyte within the plating side of the battery may be referred to as the plating electrolyte and the electrolyte on the redox side of the battery may be referred to as the redox electrolyte.

Anode refers to the electrode where electro-active material loses electrons. During charge, the negative electrode gains electrons and is therefore the cathode of the electrochemical reaction. During discharge, the negative electrode loses electrons and is therefore the anode of the reaction. Therefore, during charge, the plating electrolyte and plating electrode may be respectively referred to as the catholyte and cathode of the electrochemical reaction; the redox electrolyte and the redox electrode may be respectively referred to as the anolyte and anode of the electrochemical reaction. Alternatively, during discharge, the plating electrolyte and plating electrode may be respectively referred to as the anolyte and anode of the electrochemical reaction, the redox electrolyte and the redox electrode may be respectively referred to as the catholyte and cathode of the electrochemical reaction.

One example of a hybrid redox flow battery uses iron as an electrolyte for reactions wherein on the negative electrode $Fe^{2+}$ receives two electrons and deposits as iron metal during charge and iron metal loses two electrons and re-dissolves as $Fe^{2+}$ during discharge. On the positive electrode two $Fe^{2+}$ lose two electrons to form two $Fe^{3+}$ during charge and during discharge two $Fe^{3+}$ gains two electrons to form two $Fe^{2+}$:

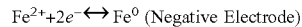

$$Fe^{2+}+2e^- \leftrightarrow Fe^0 \text{ (Negative Electrode)}$$

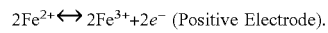

$$2Fe^{2+} \leftrightarrow 2Fe^{3+}+2e^- \text{ (Positive Electrode).}$$

The electrolyte used for this reaction is readily available and can be produced at low costs (such as $FeCl_2$). It also has a high reclamation value because the same electrolyte can be used for the plating electrolyte and the redox electrolyte, consequently eliminating the possibility of cross contamination. Unlike other compounds used in hybrid redox flow batteries, iron does not form dendrites during plating and thus offers stable electrode morphology. Further, iron redox flow batteries do not require the use of toxic raw materials and operate at a relatively neutral pH unlike similar redox flow battery electrolytes. Accordingly, it is the least environmentally hazardous of all current advanced battery systems in production.

However, the above system has disadvantages that limit its practicality in commercial applications. One of these disadvantages is the low cycling performance and poor efficiency of these batteries resulting from a discrepancy in the pH ranges at which the negative and redox electrolytes tend to stabilize. To minimize iron corrosion reactions and to increase iron plating efficiency, a pH between 3 and 4 is desired for the iron plating reaction. However, a pH less than 1 is desired for the ferrous and ferric ion redox reaction to promote redox reaction kinetics and to minimize hydroxide formation.

Concentration gradients across the membrane barrier separating the electrolytes can cause electrolyte crossover. The $Fe^{3+}$ contamination from the redox side (more acidic) to plating side (less acidic) can cause the formation and precipitation of $Fe(OH)_3$. This precipitate can foul the organic functional group of an ion exchange membrane or can clog the small pores of the micro-porous membrane. In either case, membrane ohmic resistance rises over time and battery performance degrades.

The inventors recognized that the formation of the $Fe(OH)_3$ precipitate could be reduced by the addition of chemical chelating agents in the form of organic compounds. These organic compounds could form complex compounds with $Fe^{3+}$ which has crossed over from redox side to plating side. These complex compounds are soluble in less acidic environment, and thus stabilize the ferric ions. Further, the colors and potentials of these complex compounds change with solution pH. Therefore, by monitoring the electrolyte pH via an optical sensor and/or electrochemical probe, the addition of chemical additives may be metered so as to achieve and maintain the desired pH in the electrolyte to prevent precipitation and preserve coulombic efficiency.

DETAILED DESCRIPTION

Figure 1:
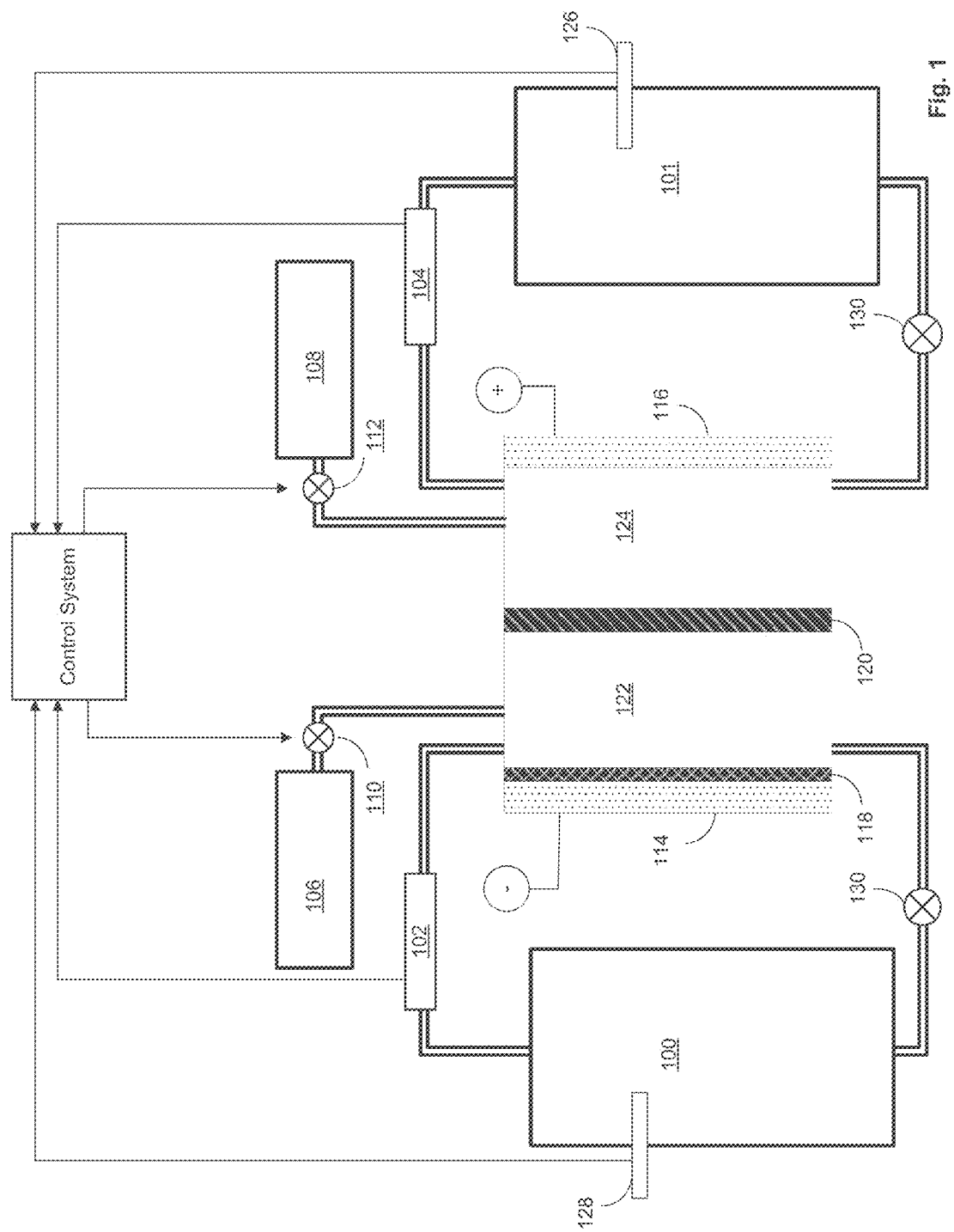
FIG. 1 is an example embodiment of the disclosed hybrid flow battery system.

As discussed above, the plating electrolyte used in the iron redox flow battery (IFB) may provide a sufficient amount of $Fe^{2+}$ so that, during charge, it can accept two electrons from the negative electrode to form $Fe^{0+}$ and solidify onto a substrate. During discharge, the solidified $Fe^{0}$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77V, creating a more positive terminal for the desired system.

The IFB provides the ability to charge and recharge its electrolytes in contrast to other battery types utilizing non-regenerating electrolytes. Charge is achieved by applying a current across the electrodes. The plating electrode may be coupled to the negative side of a voltage source so that electrons may be delivered to the electrolyte via the redox electrode. The $Fe^{2+}$ is thus oxidized to $Fe^{3+}$ and may be dissolved by the electrolyte for subsequent discharge. The electrons provided to the negative electrode can then reduce the $Fe^{2+}$ provided by the electrolyte to form $Fe^{0}$ at the plating substrate causing it to plate onto the electrode for discharge.

Discharge can be sustained while $Fe^{0}$ remains in the plating electrolyte for oxidation and the $Fe^{3+}$ remains in the redox electrolyte for reduction. The latter can be maintained by increasing the concentration or the volume of the electrolyte to the positive side of the battery to provide $Fe^{3+}$ ions via an external tank of the electrolytic chemical. The limiting factor is then more commonly the amount $Fe^{0}$ solidified onto the negative side of the battery and, consequently, proportional to the surface area and volume of the substrate that the iron may plate on as well as the efficiency of plating. Charge is limited by the same mechanism and solidifies as $Fe^{0}$ if ions are available for reduction, it may similarly be aided by an external tank providing additional electrolyte as needed.

In the above reaction the plating electrolyte chemical provides $Fe^{2+}$ and the redox electrolyte chemical provides $Fe^{3+}$ and $Fe^{2+}$ depending on the charge state of the system. The use of iron ions in the plating electrolyte and redox electrolyte provides the ability to use the same electrolytic chemical for both sides of the battery, minimizing the electrolyte cross-contamination that decreases the efficiency of the system eventually and leads to an eventual replacement of the electrolytes. In similar systems, low electrolyte reclamation value can prove an expensive maintenance cost. Further, production of the electrolyte is cost effective using inexpensive materials such as $FeCl_2$ and $FeCl_3$.

The electron configuration of iron allows it to solidify into a generally uniform solid structure on the substrate. In metals commonly used in similar redox batteries (such as Zinc) the solid structure may form dendrites during plating. The stable electrode morphology of the IFB increases the efficiency of the battery in comparison to other flow batteries. Further, no toxic raw materials are used in the battery and it utilizes electrolytes that generally operate at a pH between 1 and 3. Consequently, IFBs are the least environmentally hazardous of advanced battery systems currently in production.

However, the IFB has several key issues that contribute to performance and efficiency losses. In particular, battery efficiency losses result from electrolyte crossover through the membrane barrier. Ferric ions in the redox electrolyte are driven toward the plating electrolyte by the concentration gradient. Ferric ions that penetrate the membrane barrier may react with the iron metal on the negative side, resulting in coulombic efficiency losses. Ferric ions that penetrate from redox side (more acidic) to plating side (less acidic) can cause the formation and precipitation of $Fe(OH)_3$. This precipitation can foul the organic functional group of an ion exchange membrane or can clog the small pores of the micro-porous membrane. In either case, membrane ohmic resistance rises over time and battery performance degrades. Additional coulombic efficiency losses can be attributed to 1) the reduction of $H^+$ and subsequent formation of $H_2$ 2) the H+ ions emitted from the acidic electrolytes reacting with the plated iron metal to form $H_2$. The side reaction can result in hydrogen gassing on the negative side of the battery during charging.

$Fe(OH)_3$ precipitate formation resulting from oxidation and ferric ion crossover can cause barrier fouling. The resulting separator pore blockage may cause high battery ohmic resistance and low cell performance. Additionally, the redox electrode ($Fe^{2+}/Fe^{3+}$ couple) can experience performance losses over cycles due to a passivating oxide film accumulating on the carbon electrode surface.

FIG. 1 shows an example embodiment of an IFB. The plating electrolyte may be stored in plating electrolyte tank 100, the redox electrolyte may be stored in redox electrolyte tank 101. The plating electrolyte and redox electrolyte may be a suitable salt dissolved in water, such as $FeCl_2$ or $FeCl_3$. Both the plating electrolyte and redox electrolyte may use the same salt at different molar concentrations, a feature of the IFB not available in batteries with different reactive compounds. Both tanks may be fluidically coupled to the positive reactor 124 and negative reactor 122 of the fuel cell. Separating the negative and positive reactors and their respective electrolytes is barrier 120. The barrier may be embodied as a membrane barrier, such as an ion exchange membrane or a microporous membrane, placed between the redox electrolyte and plating electrolyte to prevent electrolyte cross-over and provide ionic conductivity. Sensors 102 and 104 may be used to determine the chemical properties of the electrolyte, including pH and may be embodied as an optical sensor. Probes 126 and 128 may additionally or alternatively be used to determine the chemical properties (discussed below) of the electrolytes. Other embodiments may have a plating electrolyte probe, plating electrolyte sensor, redox electrolyte probe, redox electrolyte sensor, or some combination thereof. The probe may also be placed inside the reacting portion of the IFB in negative reactor 122 and positive reactor 124. The acid additive may be in additional tank 106 and 108. These may contain different additives and be controlled by different routines. In other embodiments, the IFB may also have either a positive side additive or a negative side additive and not both. The positive side additive may be accelerated into the positive reactor 122 by positive additive pump 112; the negative additive may be accelerated into the negative reactor 124 by negative additive pump 110. Alternately, the electrolyte additives may be pumped into tanks 100 and 102. Pumps 122 and 124 may be actuated via a control system communicatively coupled to the pumps. The control system may be responsive to probe 126, probe 128, sensor 102, sensor 104, or any combination thereof. The electrolytes may be pumped from the reactor by pumps 130.

Figure 2:
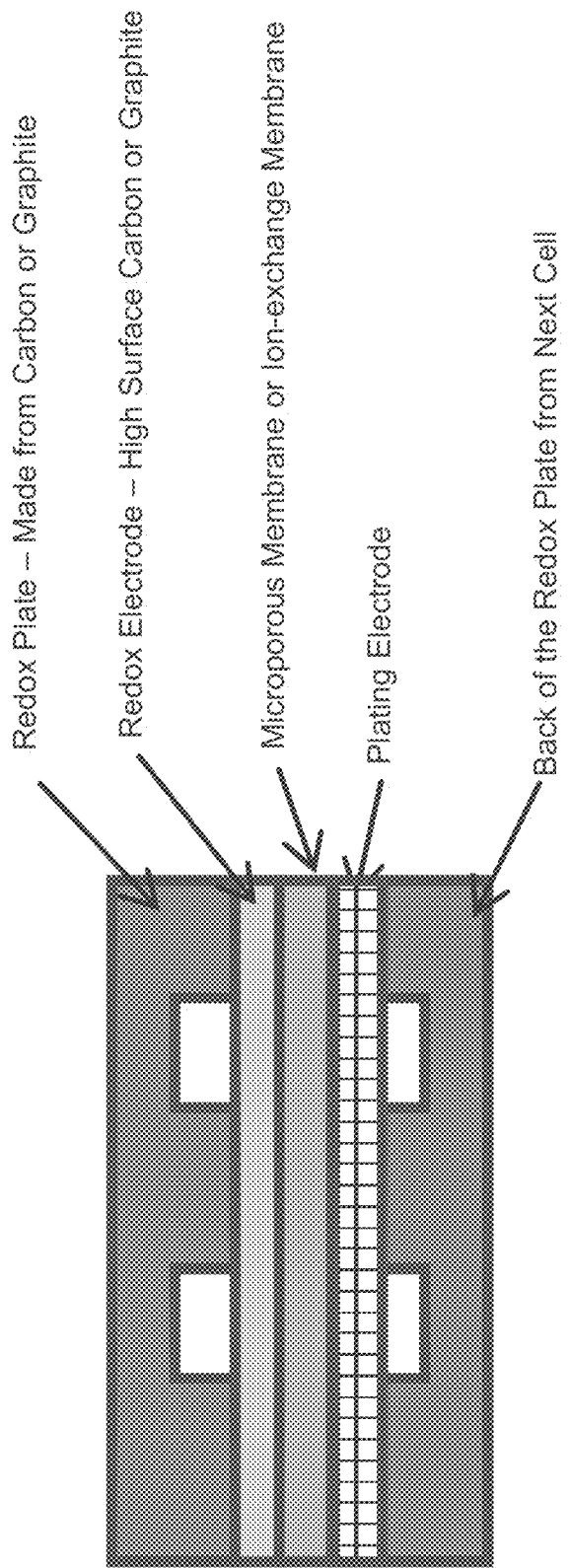
FIG. 2 shows a cross section of the disclosed hybrid flow battery system of FIG. 1.

FIG. 2 shows a cross section of an example cell of a hybrid all-iron flow battery. The top layer shows the redox plate that may be made of carbon or graphite. The redox electrode is adjacent to the redox plate and may be made of graphite. The membrane is immediately adjacent to the redox electrode and the plating electrode and separates electrolytes therein. An example plating electrode may include a substrate structure on which the $Fe^0$ may solidify during charging. In IFB's made with multiple cells, a next redox plate of an adjacent cell may be a back face adjacent to the plating electrode.

Figure 3:
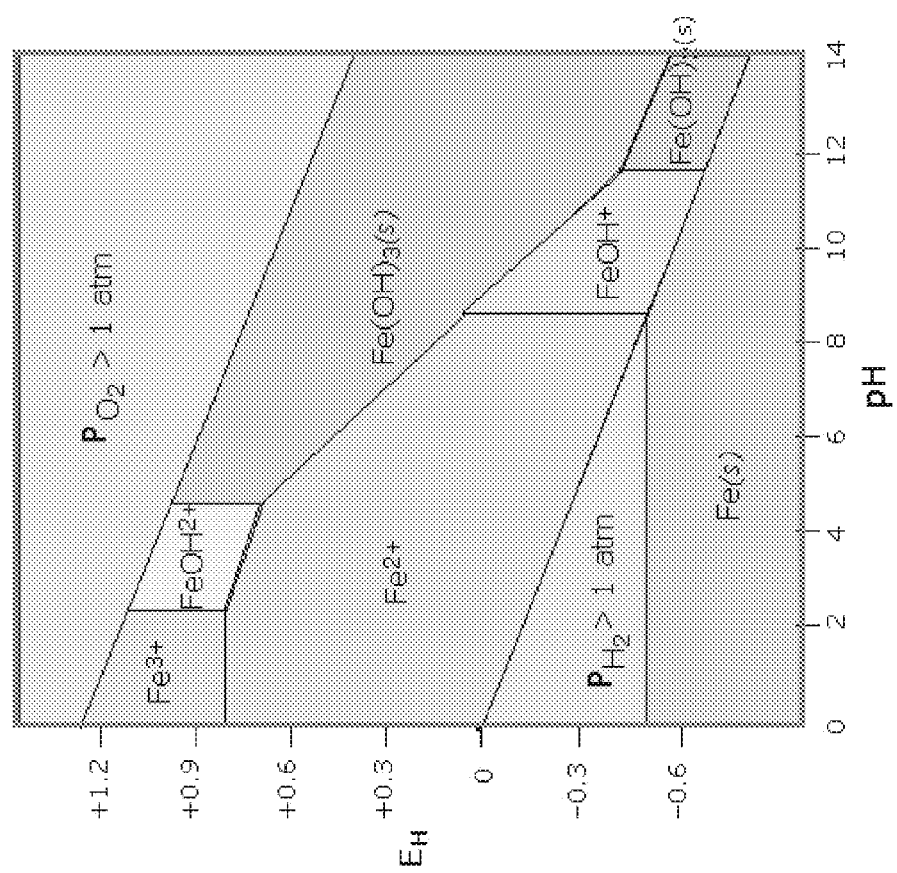
FIG. 3 is a Pourbaix diagram of Iron ions.

Cycling performance losses in the IFB may be attributed to the nature of the electrolytes' stability. FIG. 3 shows a Pourbaix diagram that helps to illustrate the electrolyte stability issue. The vertical axis of FIG. 3 represents the voltage potential with respect to the standard hydrogen electrode, pH is represented on the horizontal axis. During charge, $Fe^{2+}$ accepts two electrons to become $Fe^0$. However, the reaction competes with the reduction of $H^+$ and subsequent formation of $H_2$. As a result, the electrolyte tends to stabilize at a pH range between 3 and 6 on the negative side of the battery.

During charge, the $Fe^{2+}$ on the positive side of the battery loses one electron to form $Fe^{3+}$, an ion with a much lower logarithmic acid disassociation constant (pKa) than that of $Fe^{2+}$. Therefore, as more ferrous ions are oxidized to ferric ions, the electrolyte tends to stabilize at a pH closer to 1.

Concentration gradients on either side of the barrier during battery operation drive an amount of $Fe^{3+}$ over from redox electrolyte to plating electrolyte. The drastic change in pH from plating electrolyte to redox electrolyte (from 1 to 3-6) causes $FeOH^{2+}$ and $Fe(OH)_3$ species to form and precipitate. These precipitates degrade the membrane by poisoning the organic functional group of an ion exchange membrane or clogging the small pores of the microporous membrane. As the result, the battery's ohmic resistance rises. Precipitate may be removed by washing the battery with acid, but the constant maintenance limits the batteries use in commercial applications, it also relies upon a regular preparation of electrolyte. However, the disclosed method suppresses the above reactions by adding specific organic acids to the electrolytes in response to indications of an electrolyte pH indicative of, and contributing to, these reactions.

Figure 4:
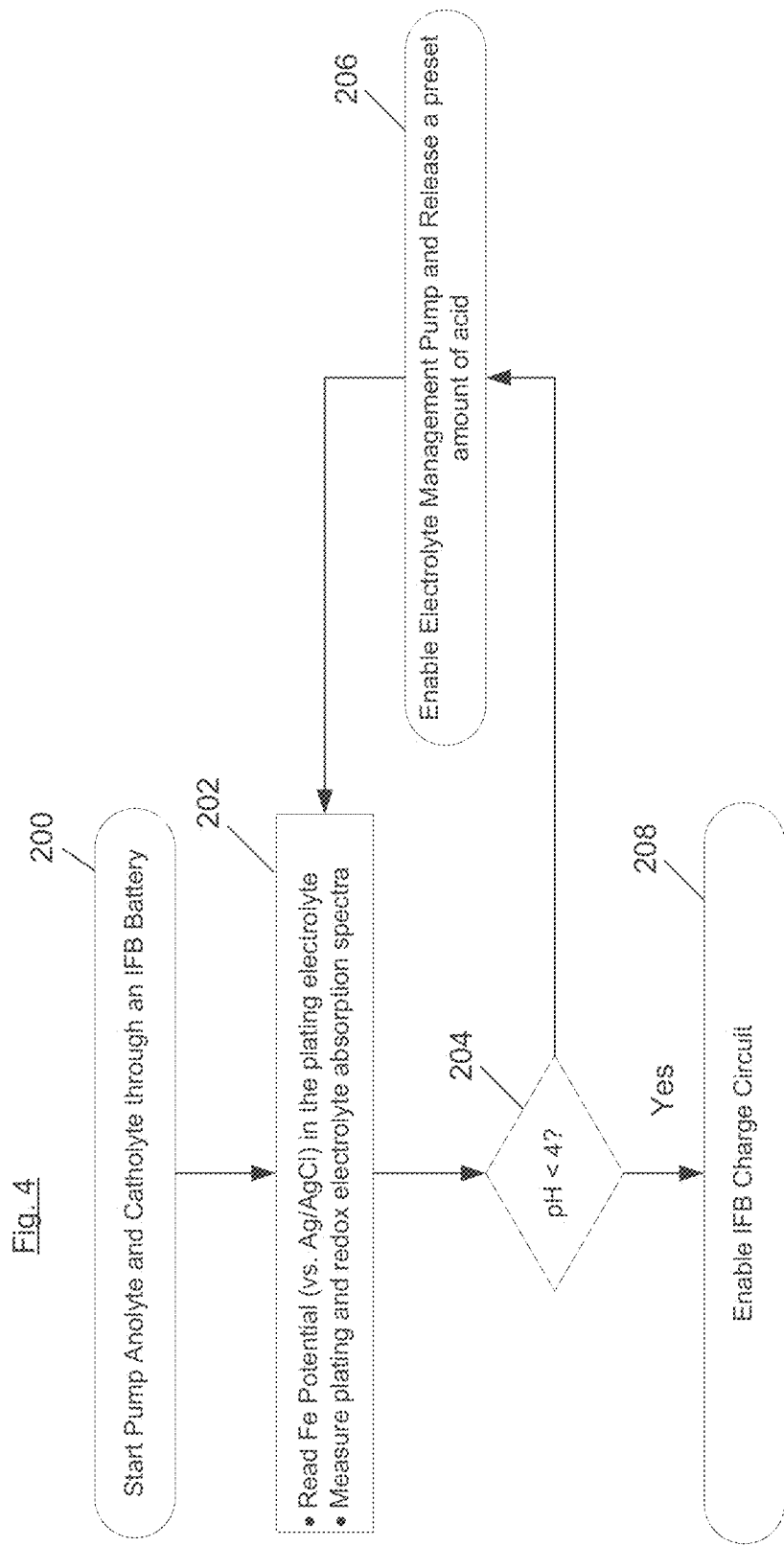
FIG. 4 depicts an example control routine within a hybrid flow battery system using the disclosed method.

Acidic additive may be added using the example method depicted in FIG. 4. The electrolytes may be pumped through their respective electrodes within the IFB at 200. At 202 the pH of the battery may be determined in the electrolyte using a Fe probe to measure the electrolyte potential vs. a reference electrode, such as Ag/AgCl or $H_2$ electrode, in the plating electrode. Alternately, the pH may be monitored by measuring the reflective spectra of the electrolyte using an optical sensor via a method that will be further discussed. Other pH sensing devices not otherwise specified may also be used for the pH determination. Sensors monitoring temperature and other operating conditions may also be communicatively coupled to a control system and used in conjunction with electrolyte pH within the disclosed method. Note that the information provided by these additional sensors may be included in the operational definition of the term "pH" when used as a system control variable herein.

In the disclosed system, the sensors and/or probes may communicate to a control system the pH of the electrolyte. If the pH of the plating electrolyte is found to be above a threshold, such as pH>4, the control system may actuate the release of a preset amount of a prepared acid that may be added to the plating electrolyte at 204. If the pH of the redox electrolyte is found to be above a threshold, such as pH>1, the control system may actuate the release of a preset amount of a prepared acid to the redox electrolyte. The acid additive added to the negative and positive sides may be the same or different and may include but are not limited to hydrochloric acid, boric acid, ascorbic acid, acetic acid, malic acid, lactic acid, citric acid, tartaric acid, isoascorbic acid, malonic acid, glycolic acid, or any combination thereof. The process may return back to 202 to again measure the pH, the process may repeat until the pH falls below the threshold. If the pH is below the threshold the IFB may continue to charge or discharge.

The disclosed embodiment achieves suppression of the aforementioned problematic reactions by adding specific chemicals (acid additives) to the electrolytes. The acid additives to the electrolytes may stabilize $Fe^{3+}$ crossover from the redox electrolyte to the plating electrolyte, thus the acid additives used in the embodiment have specific chemical properties. Chemical additives that are organic chemicals with short chains (<6C) and with —OH and/or —COOH groups are sought to stabilize the ferric/ferrous ions by forming large complexes with these ions. A shorter carbon chain is sought to minimize the negative effect these organic acids may have on overall battery coulombic efficiency because these organic acids may have the side reaction of carbon formation during battery charging. The acids studied for addition and some of their properties are listed in table 1 below.

TABLE 1

Organic Acids Tested for Stabilizing IFB Electrolytes

| Acid | Equation | Efficiency pH > 2.5 | % Carbon | g/mol | pKa | Notes |
|---|---|---|---|---|---|---|
| Boric | $H_3BO_3$ | | | 64.0 | 9.237 | Reported for $H_2$ suppression |
| L-Ascorbic | $C_6H_8O_6$ | | | 176.12 | 4.10 | C-A bath, but also used with Citric acid |
| Glycolic | $C_2H_4O_3$ | 93% | 0.00% | 79.050 | 3.83 | Testing at 10 $mA/cm^2$. Grayish dull, rough surface |
| L-lactic | $C_3H_6O_3$ | 79% | 0.00% | 90.080 | 3.86 | Testing at 10 $mA/cm^2$. Grayish dull, rough surface |
| L-Malic | $C_4H_6O_5$ | 90% | 0.60% | 134.090 | 3.40 | Testing at 10 $mA/cm^2$. black and bright surface. Black oxides precipitated at current densities above 33 $mA/cm^2$. Black color was only due to surface film |
| L-Tartaric | $C_4H_6O_6$ | >90% | >2.5% | 150.087 | 2.95 | Testing at 10 $mA/cm^2$. burnt. Lots of black precipitates |
| Citric | $C_6H_8O_7$ | 83% | 1.00% | 192.124 | 3.09 | Testing at 10 $mA/cm^2$. black and bright surface. Black oxides precipitated at current densities above 39 $mA/cm^2$. Black color was only due to surface film |
| Oxalic | $C_2H_2O_4$ | 95% | 0.13% | 90.030 | 1.25 | Testing at 10 $mA/cm^2$. Grayish dull, rough surface |
| Malonic | $C_3H_4O_4$ | 95% | 0.13% | 104.060 | 2.83 | Testing at 10 $mA/cm^2$. Grayish dull, rough surface |
| Acetic | $C_2H_4O_2$ | 95% | 0.10% | 60.050 | 4.76 | Testing at 10 $mA/cm^2$. Grayish dull, rough surface |
| Butonic | $C_4H_8O_2$ | 95% | .0.15% | 88.110 | 4.82 | Testing at 10 $mA/cm^2$. Grayish dull, rough surface Stinky |
| Erythorbic | $C_6H_8O_6$ | | | 176.18 | 2.1 | In patent as additive |

Figure 5:
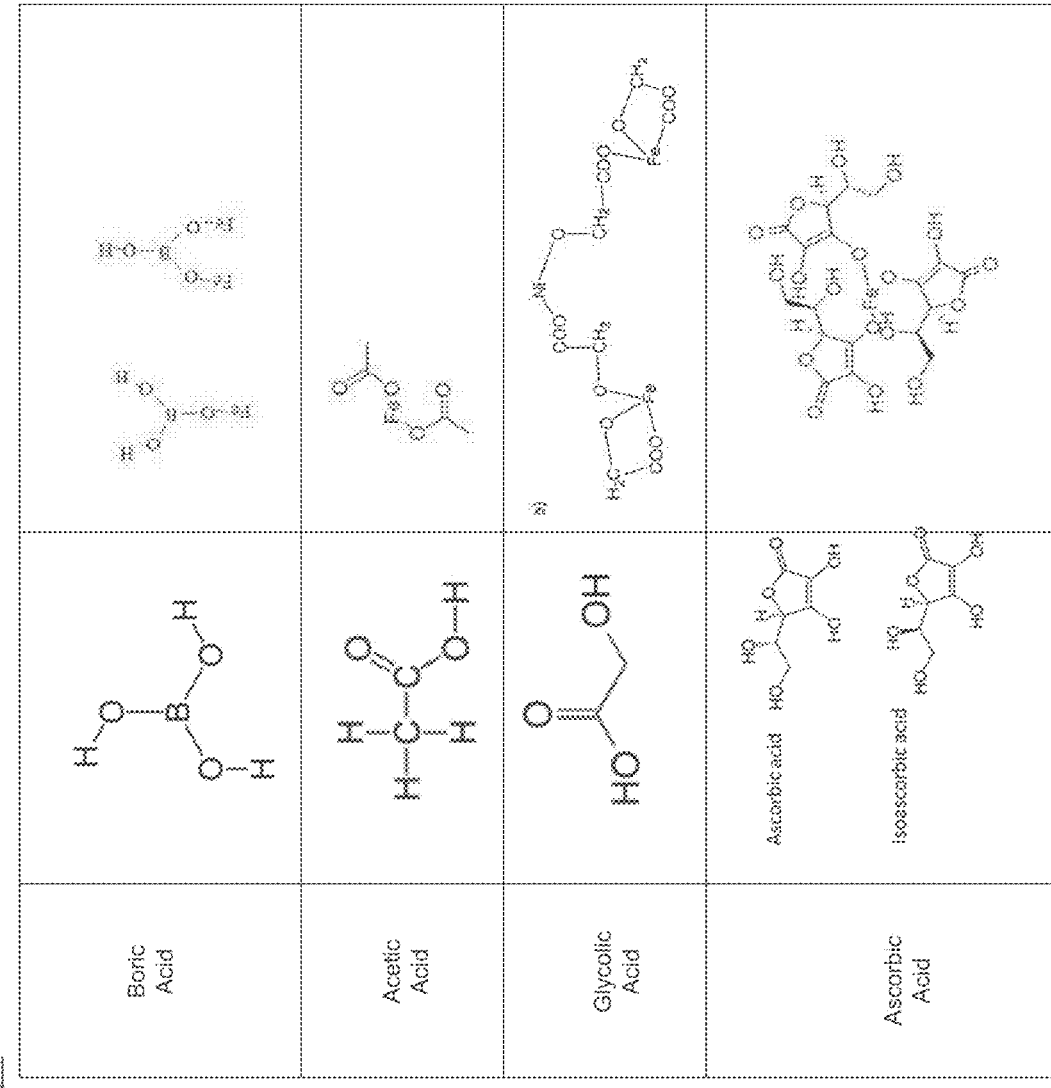
FIG. 5 illustrates example compounds that formed from Iron and 4 different acidic compounds.

A few examples of the complex structure with ferrous/ferric ions are shown in FIG. 5.

TABLE 2

Organic-Ferrous/Ferric Stability with pH

| pH | Acetic Acid | Ascorbic Acid | Isoascorbic Acid | Malonic acid |
|---|---|---|---|---|
| >2 | No Precipitation | No Precipitation | No Precipitation | No Precipitation |
| >3 | Precipitation | No Precipitation | No Precipitation | No Precipitation |
| >4 | Precipitation | No Precipitation | No Precipitation | No Precipitation |

The inventors determined electrolyte stability with these additives and Fe plating coulombic efficiencies using an H-Cell setup. Baths were prepared from reagent-grade chemicals and deionized distilled water that contained 0.5 mol/l $FeCl_2$ and various ratio of one of the organic acids. Bath initial pH ranged from 2 to 3 and they were not adjusted. A graphite rod was used as the plating electrode and a graphite plate was used as the redox electrode. Electrodeposition was carried out at a constant current density of 10 $mA/cm^2$. The bath was kept at room temperature. The baths were not agitated because bath agitation decreases current efficiency since the H reduction current attains the diffusion limited current at a more noble potential than Fe deposition and therefore increases with agitation. Current efficiency was evaluated from the weight of the deposits obtained at a given amount of charge assuming that only Fe was deposited from $Fe^{2+}$; this assumption is valid because of the relatively low carbon and oxygen content in the deposits.

Figure 6:
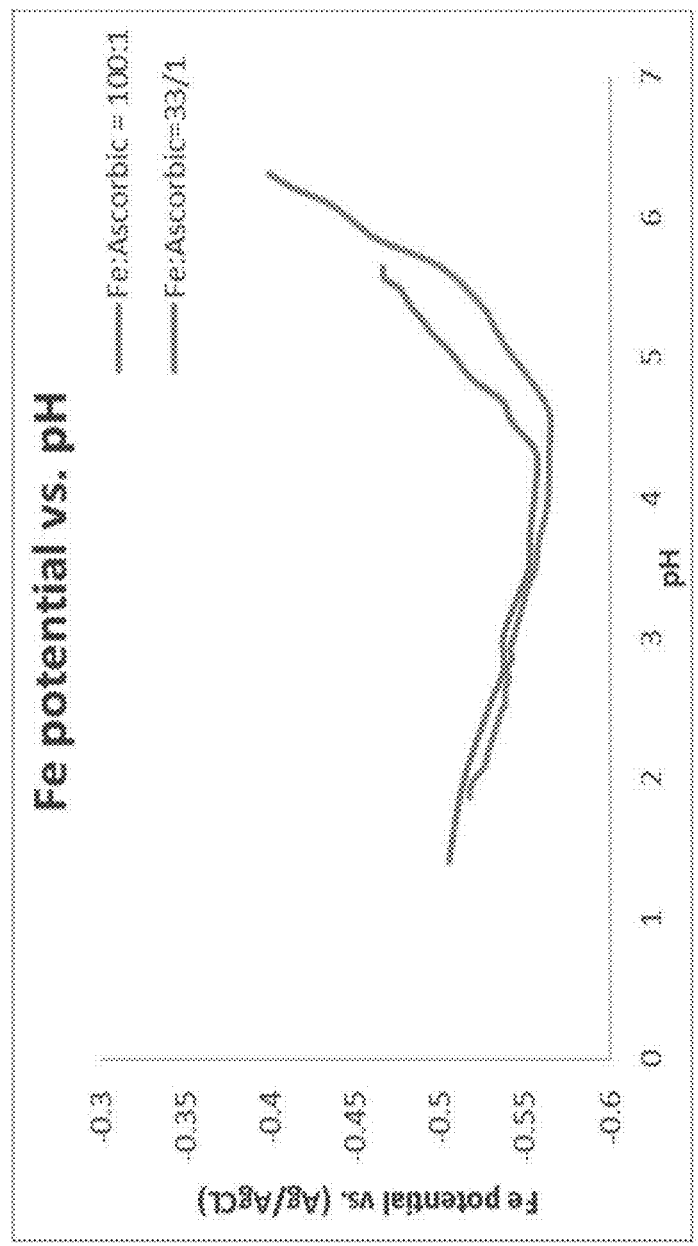
FIG. 6 graphically depicts the Fe potential vs. pH of two electrolytes with different Iron concentrations.

The equilibrium potentials of an iron surface in IFB electrolytes at various solution pH and different Fe-to-organic-acid ratios are shown in FIG. 6. As shown, Fe equilibrium potential decreases slightly between pH 1 to pH 4 and then the equilibrium potential rises significantly with pH. The increase is due to thin layers of iron oxide that form on the iron surface at higher pH levels. When running an IFB, if the electrolyte pH changes from 4 to 5, the battery plating equilibrium potential could be 50 mV worse, and as the result, the IFB performance could be 50 mV worse.

The Fe potential as a function of pH is graphically represented in FIG. 6. The relationship depicted in FIG. 6 may be used by the control system to meter pH in the disclosed system. In an embodiment, the control system may measure Fe potential and determine pH using the relationship depicted in FIG. 6, or a similar relationship for a corresponding Fe concentration. The pH measurement may be used in the method described in FIG. 4. In other embodiments, the control system may initiate or increase the addition of an acid additive in order to achieve a desired Fe potential determined by the relationship depicted in FIG. 6.

Figure 7:
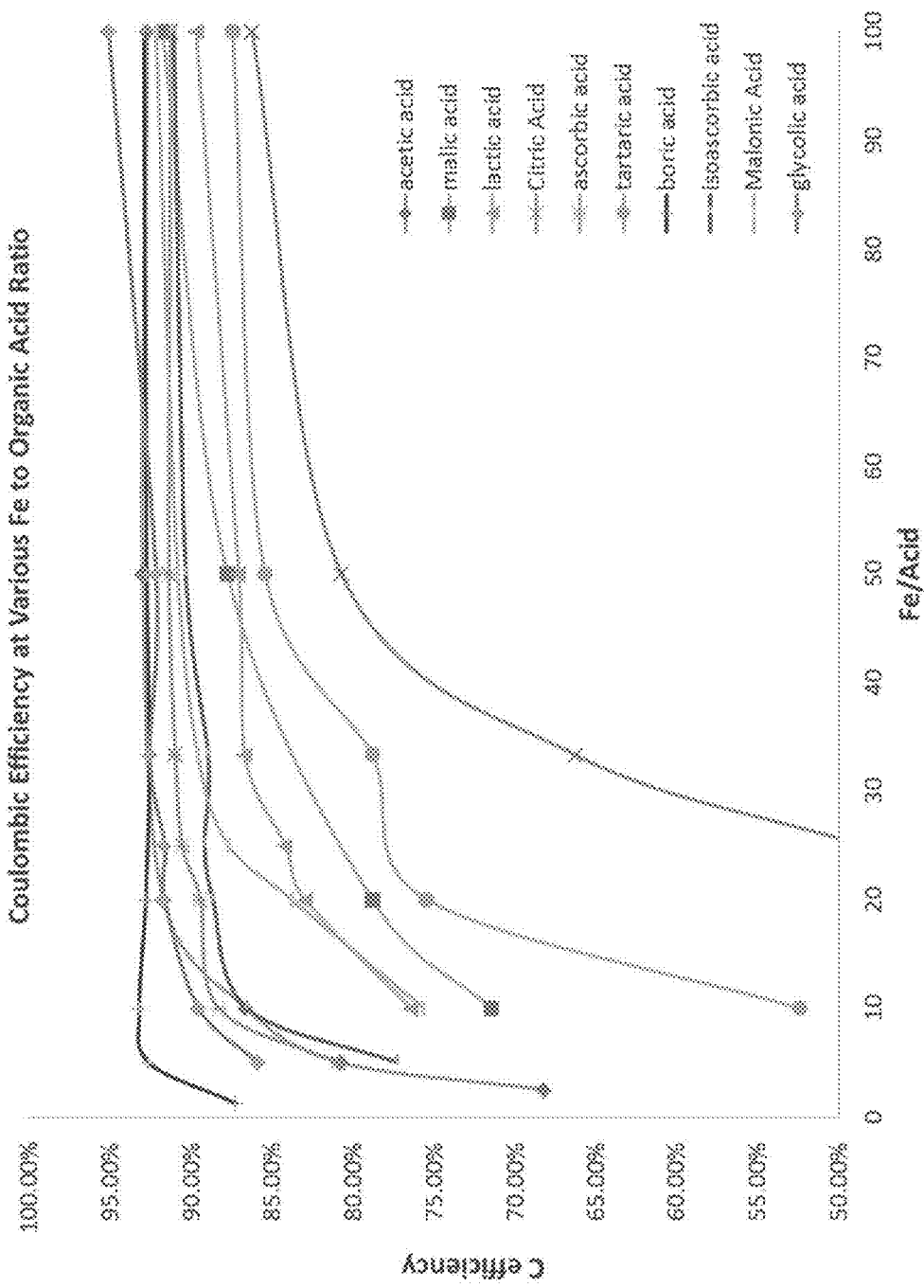
FIG. 7 graphically depicts the Coulombic efficiency to Fe:Acid concentrations of several acids.

The coulombic efficiency of Fe plating using these organic acids at various ratios is presented in FIG. 7. The relationship presented in FIG. 7 may, in some of the disclosed embodiments, be determinative of the chemical composition of the acid additives employed. For example, if a coulombic plating efficiency above 85% is desired, and malonic acid is used as the acid additive, the control system may maintain a Fe/Acid ratio above 20%. The ratio may be maintained via a predetermined maximum amount of acid additive that may be based on the volume and composition of the electrolyte. As shown in FIG. 7, boric acid, ascorbic acid, L-ascorbic acid, glycolic acid, acetic acid and malonic acid all show high Fe plating coulombic efficiencies at high Fe to acid ratios. As more acid (lower Fe:acid ratio) were added to the electrolyte, plating coulombic efficiencies drops. This results from the formation of carbon from the organic acids during charging. This chart was used to define the range of organic acids used in the battery.

Figure 8:
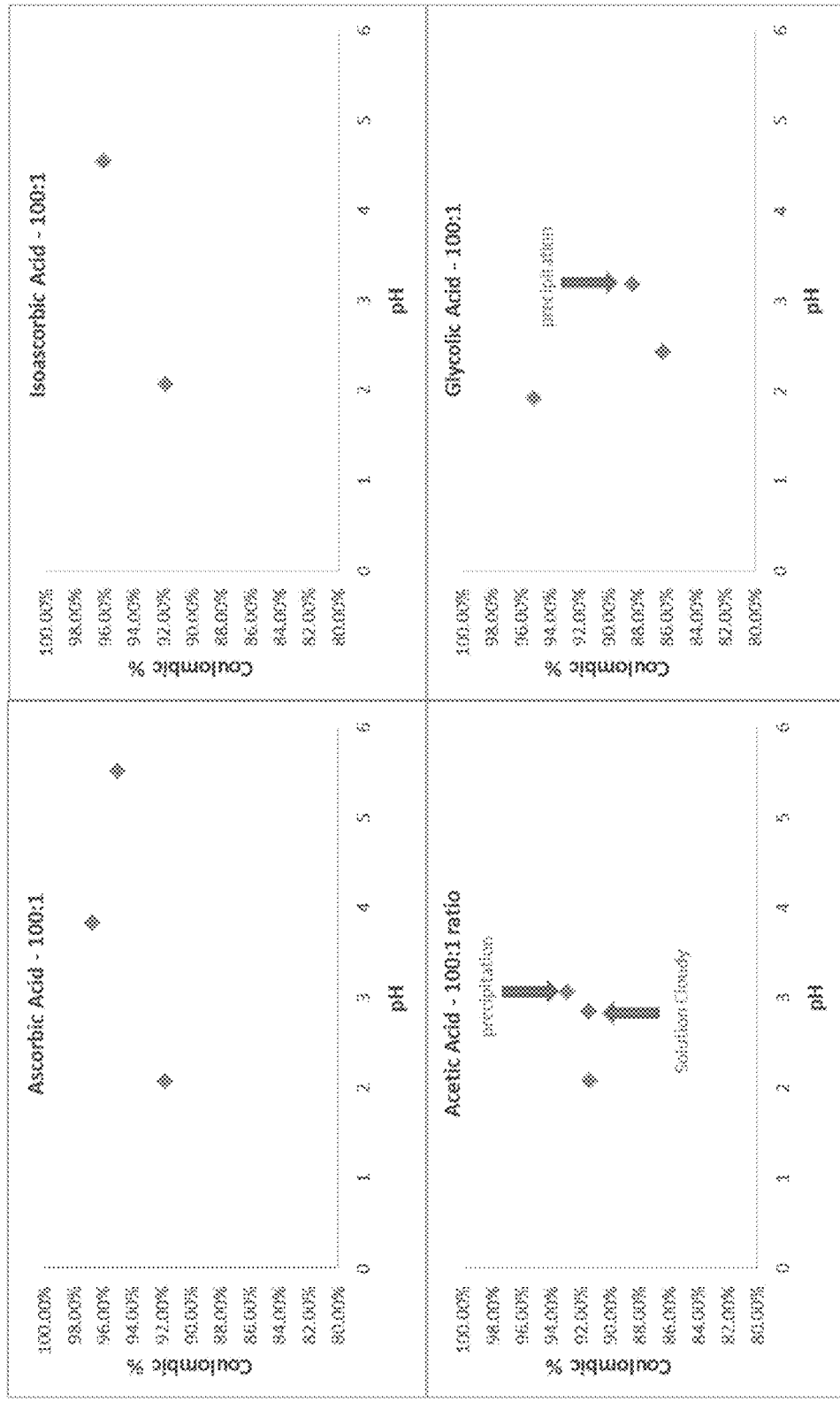
FIG. 8 graphically depicts the Coulombic plating efficiency to pH ratio of 4 different acid additives.

Furthermore, the same H-cell tests were performed on several Fe:organic acid ratios to study the crossover ferric ion stability at various pH of the plating side as shown in FIG. 8. In some embodiments of the disclosed system, the results in FIG. 8 were used by the control system to determine the desired pH of the electrolytic solution to achieve a desired coulombic efficiency. As an example, FIG. 8 graphically depicts the coulombic efficiency of iron plating for different plating solution pH levels. As shown in Table 2 and FIG. 8, acetic acid and glycolic acid (not shown) alone cannot stabilize the crossover ferric ion at high pH. However, ascorbic or isoascorbic acid alone is not ideal to be used as the organic acid because of C formation leading to reduced coulombic efficiency. Carbon formation was detected through electron microscope scanning on iron film plated from a bath with ascorbic acid only.

Therefore, in some embodiments of the disclosed system, combination of organic acid additives may be utilized to achieve the optimal iron plating bath for performance, efficiency, and stability. In an example embodiment, an electrolyte solution of $FeCl_2$ and NaCl, a first acid (such as boric acid) can be added for $H_2$ side reaction suppression and high coulombic efficiencies. Additionally, a second acid (such as ascorbic acid) can be added for ferric ion stability and a third acid (such as glycolic acid) can be added for minimizing carbon formation.

Figure 9:
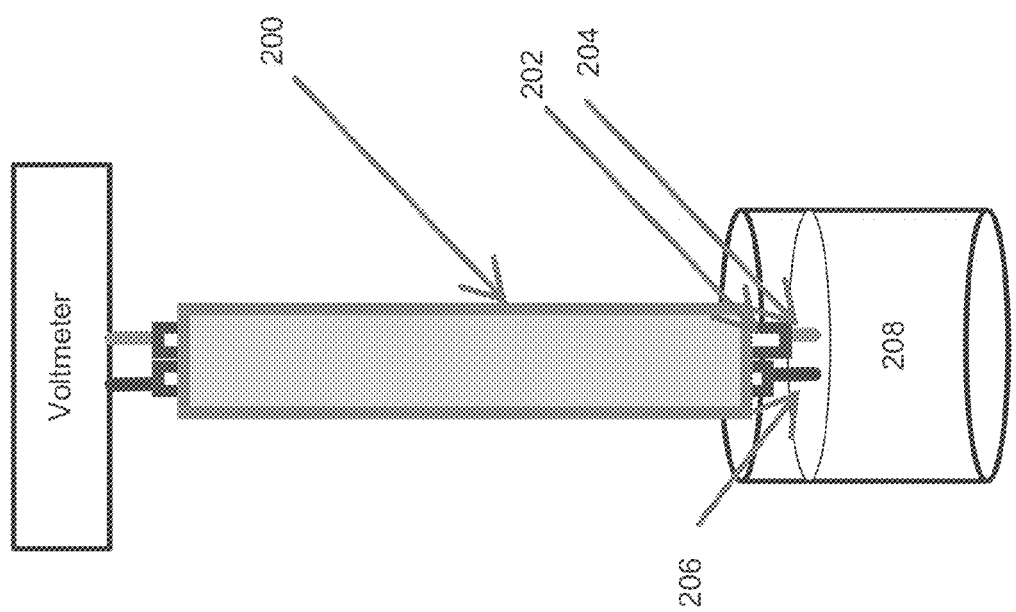
FIG. 9 depicts an example embodiment of an electrolyte probe for the disclosed system.

To mitigate electrolyte sensitivity to pH, an example battery may use the iron potential probe shown in FIG. 9. The probe may be produced with a clean iron wire in conjunction with a reference electrode such as an Ag/AgCl wire or a $H_2$ electrode. The probe can be placed in the electrolyte tank where Fe potential may be monitored over time. When Fe potential of the electrolyte drifts up, a calculated small amount of acid can be added to the electrolyte to adjust its pH. By metering the amount of electrolyte additive added in response to the presiding pH, the electrolytes can be more precisely maintained at the ideal pH and composition for redox.

The embodiment in FIG. 9 is an Fe potential probe that may be used to measure the potential on $Fe^0$ and a corresponding pH within the plating electrode. The potential probe may have inert electrode 206 that may be a wire made of iron or another inert or quasi-inert metal such that the electrons in the metal will not oxidize or will oxidize at a known rate. Reference electrode 200 may be a wire containing silver (Ag) and an Ag salt such as AgCl or a $H_2$ reference electrode. For example, in an embodiment, the Fe probe may be placed in the plating electrolyte to measure solution potential on Fe. Further, Fe may represent the solution potential and pH for the plating side of the battery. The electrodes may be electrically isolated from each other by insulator 202 that may be made of any material with low or no conductivity. Heat shrink 200 acts to keep the Fe and the reference electrode at a set distance.

In other embodiments of the disclosed system, the pH of the electrolytes may also be monitored by a sensor that may be used independently, or in combination with, the probe. In an embodiment, the optical sensor may measure the absorption spectrum of ambient light through the liquid to determine the corresponding pH. The optical sensor can also be used to monitor battery state of charge if chelating organic acid is added to the electrolyte to increase iron ion stabilities. This is because chelated iron complex shows different color at different pHs. For example, if ascorbic acid is used as the chelating agent, the iron solution color goes from green to violet and then black from pH of 2 to pH of 6.

Figure 10:
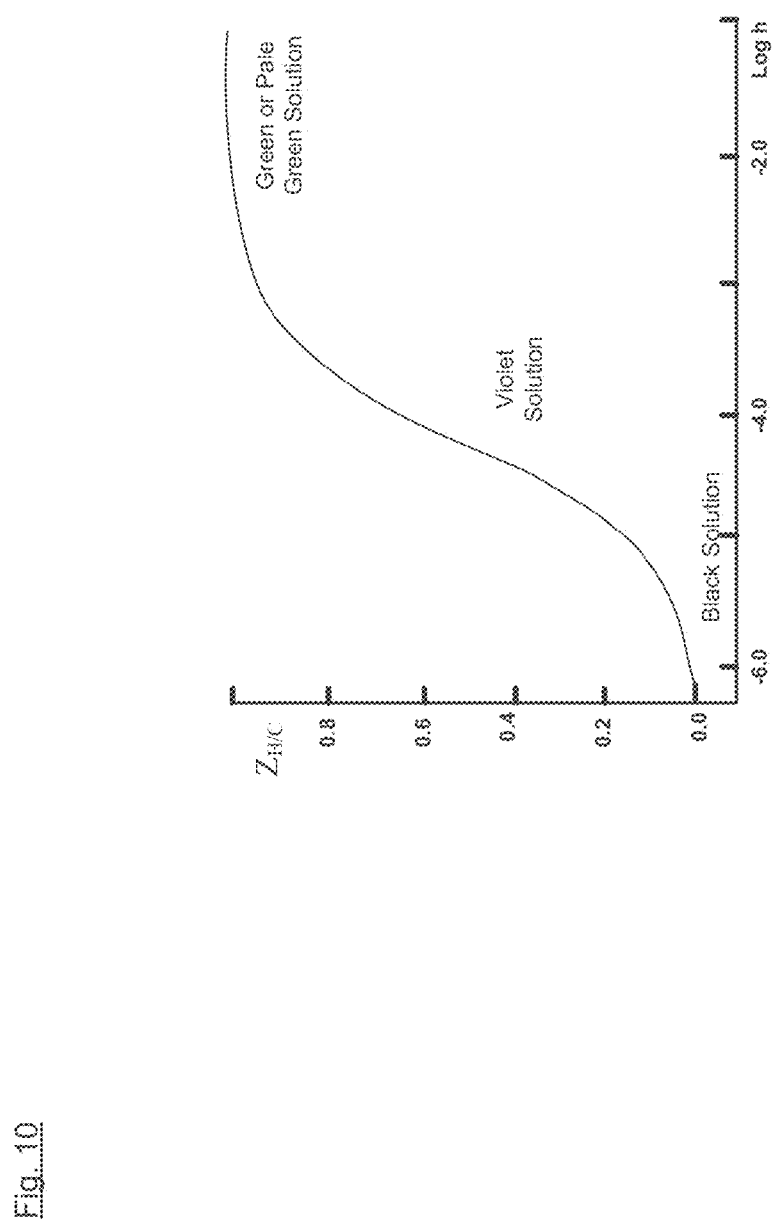
FIG. 10 graphically depicts the color of an example electrolyte as a function of pH.

The control system communicatively coupled to the sensor may determine the pH using the pH to color relationship depicted in FIG. 10. Here the pH-color relationship depicted graphically, in which the vertical axis represents the average number of H+ bound per carbon atom and the horizontal axis is a logarithmic representation of h. As shown, at low pH (higher number of H+ bound per C) the solution is green or pale, as the number of free H+ increases (increasing pH) the solution becomes violet and eventually black when the average number of free H+ is highest. By measuring the wavelength of ambient light or a light from a known source through and/or reflected by the electrolyte, the pH of the electrolyte may be determined.

In an example embodiment, white light may be incident on the surface of the electrolyte. A spectroscope may be utilized within the sensor to determine the wavelength of light reflected by the electrolyte. If a reflected and/or transmitted wavelength is found to be, for instance, less than 450 nm (corresponding to a violet hue) acid additive may be added to the solution to lower the electrolyte pH. Further, the spectroscope may continue to monitor the absorption spectra of the electrolyte and if the reflected and/or transmitted wavelength is found to be above a threshold, such as 510 nm (corresponding to a green hue), the addition of acid additive may be terminated.

On the negative side of the IFB, during charge $Fe^{2+}$ accepts two electrons and forms $Fe^0$. The competing reaction on the negative side of the battery ($H^+$ accepts one electron and forms $H_2$) results in the tendency of the electrolyte on the negative side of the IFB to rise over cycles from pH of 2 to pH of 6 thus embodiments of the disclosed system may use the probe and sensors above to monitor pH change.

As shown previously in FIG. 6, the pH change may result in up to 100 mV 'apparent' performance loss of the battery due to Fe equilibrium potential drifting up with higher pH level. To mitigate performance loss, an embodiment of the disclosed Fe Potential Probe or optical sensor, such as those described above, may be used to monitor battery state of charge as well as the electrolytes' pH level.

The operation window for the plating electrolyte of the battery is between pH of 3 and 4. Therefore, in an embodiment, when either a Fe Potential Probe or an optical sensor shows a pH level above 4, a small, pre-calculated amount of acid may be added to the plating electrolyte solution to return the plating electrode to an optimal pH range. As a result, the battery performance may be stabilized.

It will be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An iron redox flow battery system, comprising:
a redox electrode fluidically coupled to a redox electrolyte tank;
a plating electrode fluidically coupled to a plating electrolyte tank, wherein a plating electrolyte is fluidically coupled to a plating electrolyte acid additive or a redox electrolyte is communicatively coupled to a redox electrolyte acid additive;
a pH monitoring device monitoring a pH of the plating electrolyte or redox electrolyte;
an additional additive tank fluidically coupled to one of the redox electrolyte tank or the plating electrolyte tank via an additive pump, the additive tank separate from the redox electrolyte tank and the plating electrolyte tank; and
a control system communicatively coupled with the pH monitoring device and the additive pump, and having instructions stored therein to pump an amount of plating electrolyte additive or redox electrolyte additive via the additive pump in response to the pH monitoring device.

2. The system of claim 1, wherein the plating electrolyte or redox electrolyte includes $FeCl_2$, $FeCl_3$, $FeSO_4$, $Fe_2(SO_4)_3$, or any combination thereof.

3. The system of claim 2, wherein the plating electrolyte or redox electrolyte includes NaCl, $NH_4Cl$, LiCl, $Na_2SO_4$, $(NH_4)_2SO_4$, $Li_2SO_4$, or any combination thereof.

4. The system of claim 1, wherein the pH monitoring device is a Fe potential probe comprising a clean iron wire in conjunction with a reference electrode such as an Ag/AgCl electrode or an $H_2$ electrode.

5. The system of claim 1, wherein the plating electrolyte additive, redox electrolyte additive, or both include boric acid, ascorbic acid, acetic acid, malic acid, lactic acid, citric acid, tartaric acid, isoascorbic acid, malonic acid, glycolic acid, or any combination thereof.

6. The system of claim 1, wherein the plating electrolyte, redox electrolyte, or both include chelating organic acid.

7. An iron redox flow battery system, comprising:
a redox electrode fluidically coupled to a redox electrolyte tank having a redox electrolyte solution;
a plating electrode fluidically coupled to a plating electrolyte tank having a plating electrolyte solution, where the plating electrolyte and redox electrolyte are coupled to a plating electrolyte additive and a redox electrolyte additive respectively;
a pH monitoring device monitoring a pH of the plating electrolyte or redox electrolyte;
an additional additive tank fluidically coupled to one of the redox electrolyte tank or the plating electrolyte tank via an additive pump, the additive tank separate from the redox electrolyte tank and the plating electrolyte tank; and
a control system communicatively coupled with the pH monitoring device and the additive pump, and having instructions stored therein to pump a determined amount of plating electrolyte additive or redox electrolyte additive added to the plating electrolyte solution or redox electrolyte solution, respectively, in response to a comparison of the pH monitoring device and a desired pH.

8. The system of claim 1, wherein the control system further comprises instructions stored therein to determine a desired pH to achieve a desired coulombic efficiency, and adjusting the additive pump responsive to a measured pH to meter an amount of the electrolyte additive added in response to the pH.

9. The system of claim 1, wherein the control system further includes instructions stored therein to add a pre-calculated amount of acid to the plating electrolyte responsive to a measured pH level above 4.

* * * * *